(12) United States Patent
Küçük

(10) Patent No.: US 9,458,722 B2
(45) Date of Patent: Oct. 4, 2016

(54) HIGH EFFICIENCY PROPELLER BLADE WITH INCREASED PRESSURE SIDE SURFACE

(75) Inventor: Osman Küçük, Derince (TR)

(73) Assignee: Osman Kucuk, Derince, Kocaeli (TR)

( * ) Notice: Subject to any disclaimer, the term of this patent is extended or adjusted under 35 U.S.C. 154(b) by 708 days.

(21) Appl. No.: 13/881,940

(22) PCT Filed: Oct. 17, 2011

(86) PCT No.: PCT/TR2011/000233
§ 371 (c)(1),
(2), (4) Date: Jul. 15, 2013

(87) PCT Pub. No.: WO2012/057717
PCT Pub. Date: May 3, 2012

(65) Prior Publication Data
US 2013/0287582 A1    Oct. 31, 2013

(30) Foreign Application Priority Data

Oct. 27, 2010    (TR) .................................. 2010/08900

(51) Int. Cl.
| | | |
|---|---|---|
| F01D 5/14 | (2006.01) | |
| B63H 1/26 | (2006.01) | |
| B64C 11/18 | (2006.01) | |
| F04D 29/18 | (2006.01) | |
| F04D 29/38 | (2006.01) | |

(52) U.S. Cl.
CPC F01D 5/14 (2013.01); B63H 1/26 (2013.01); B64C 11/18 (2013.01); F04D 29/181 (2013.01); F04D 29/384 (2013.01); F05B 2240/30 (2013.01); Y02E 10/721 (2013.01); Y02T 70/542 (2013.01)

(58) Field of Classification Search
CPC ........... F01D 5/14; F01D 5/141; B63H 1/14; B63H 1/26; B64C 11/18; F04D 29/181; F04D 29/384; F05B 2240/30
USPC ........................................................ 416/242
See application file for complete search history.

(56) References Cited

U.S. PATENT DOCUMENTS 4,073,601 A * 2/1978 Kress ....................... B63H 1/26
                                                        416/223 R

FOREIGN PATENT DOCUMENTS

GB        683012 A * 11/1952 ............... B63H 1/15

* cited by examiner

*Primary Examiner* — Christopher Verdier
*Assistant Examiner* — Juan G Flores
(74) *Attorney, Agent, or Firm* — Egbert Law Offices, PLLC

(57) ABSTRACT

A propeller used in aircraft/sea vessels, pumping systems, wind and hydraulic turbines is provided. Propeller blades are distributed around the propeller hub and positioned so as to set an angle with the axis (x) of the propeller hub, to a concave curvilinear contact surface formed on the suction side of said blades that push water and to a convex outlet surface which follows this concave surface and is shorter than said concave surface.

2 Claims, 3 Drawing Sheets

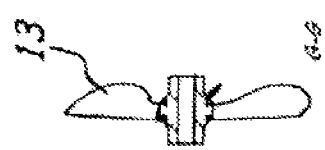
Figure-2.1
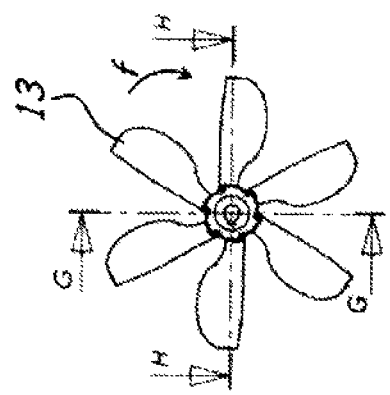
Figure-2
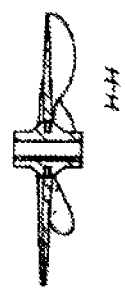
Figure-2.2
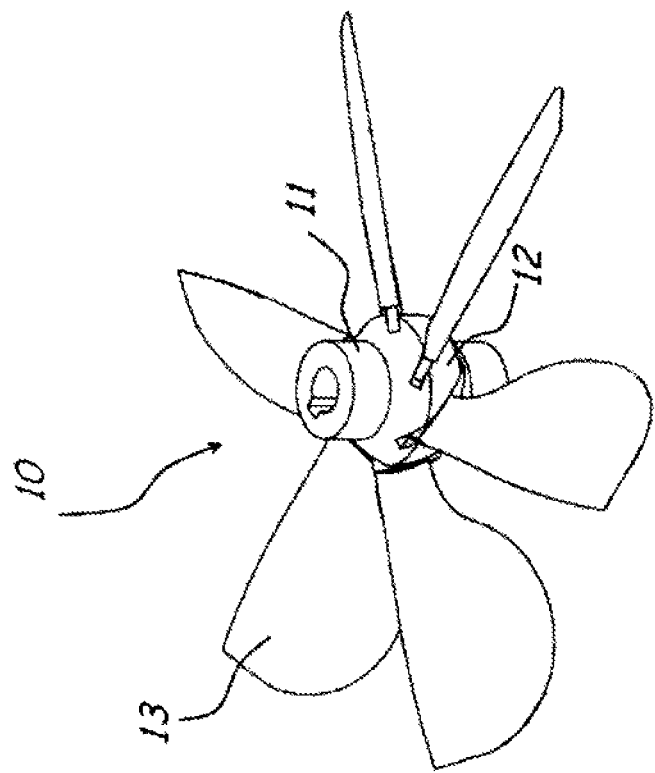
Figure-1

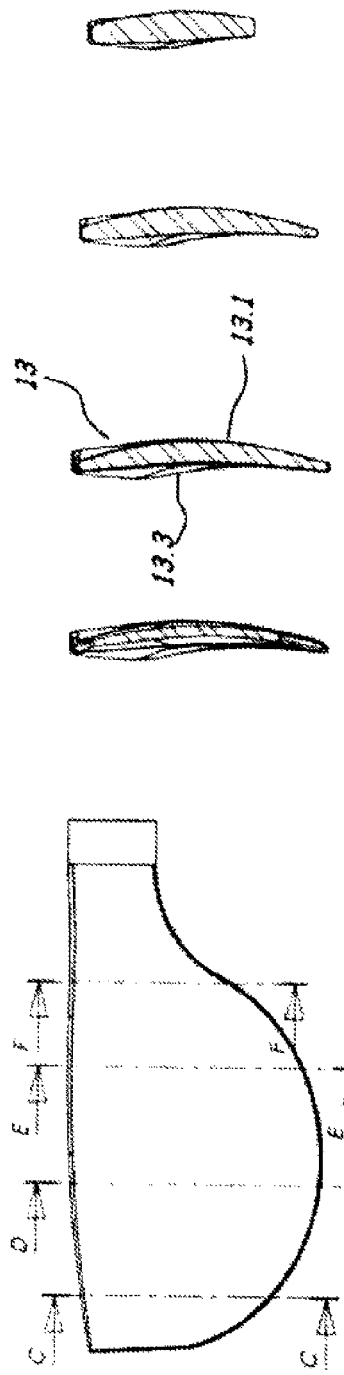
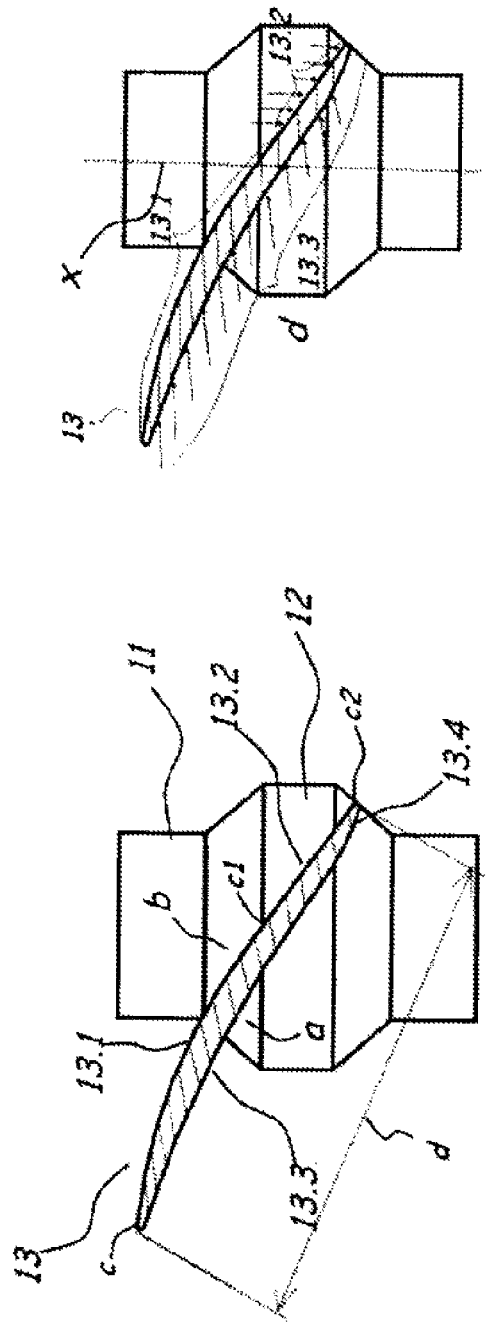

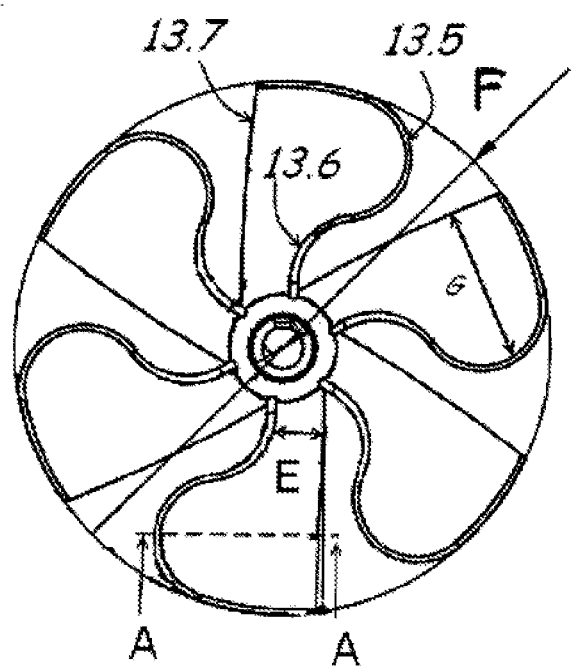
Figure-5
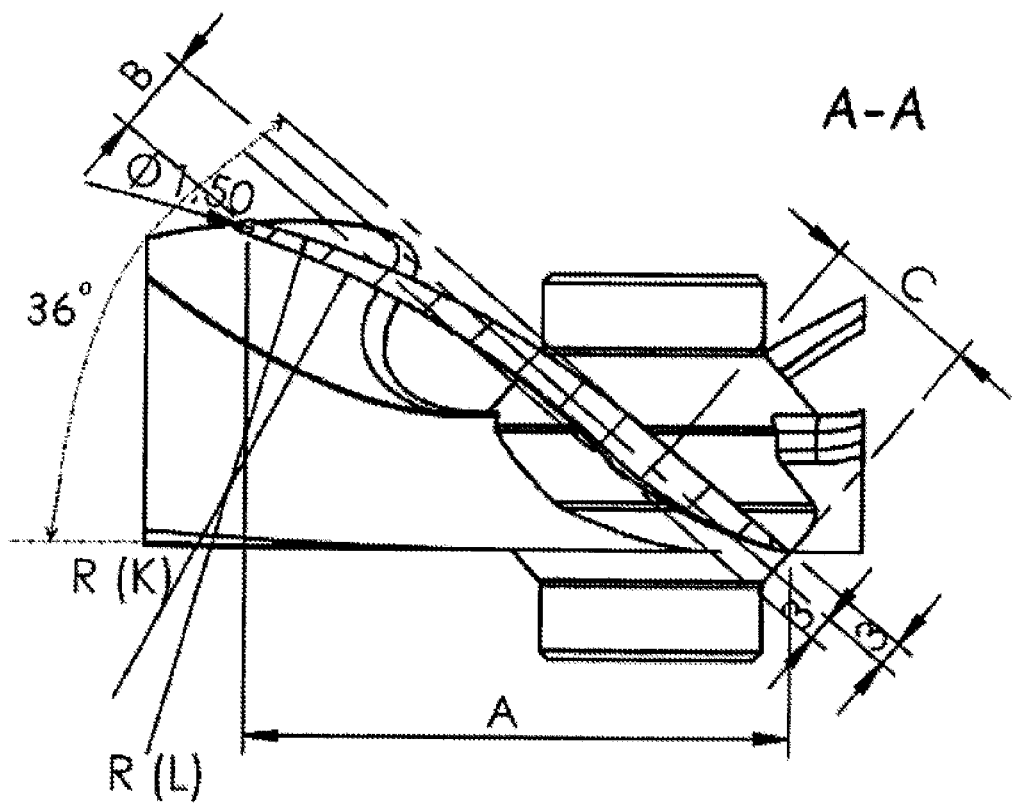
Figure-5.1

HIGH EFFICIENCY PROPELLER BLADE WITH INCREASED PRESSURE SIDE SURFACE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The current invention is related to a high energy efficiency propeller which is developed to use in aircrafts and sea vehicles, pumping systems, wind turbines and hydro-energy turbines.

Said invention is related to propeller blades which are distributed around propeller hub and positioned so as to set an angle with the axis of propeller hub (x), to a concave curvilinear contact surface which are formed on the front surface of said blades that push water and to a convex outlet radius which follows this contact surface and is shorter than said contact surface.

2. Description of Related Art including Information Disclosed Under 37 CFR 1.97 and 37 CFR 1.98

As it is known, the ship propeller is a driving component which is used to move the vessels and makes a rotational motion by the drive. The propellers produced in various forms transform the power generated by the hull machines to propellant power to move the vessel on the water. The propeller accelerates water flowing through it and the reaction resulted from increase of motion quantity caused by this accelerated flow pushes the vessel forward. The increase of motion quantity is ensured either by a slight speed increase in a huge water mass (large, slow operating propellers) or by a big speed increase in a small water mass (small, high speed propellers). The first system has higher efficiency.

The shape of the hull of ship has a significant effect on water flow towards propeller. As the ship drags a part of water mass with while moving ahead, the relative headway of the propeller inside water is lower than the real speed of the ship.

The axial speed of water differs in various parts of the propeller. Hence, each rotating blade passes through water areas having high and low speeds. In general the relative water speed reaches its lowest level while the blade is in its highest position (vertical) and it reaches its highest level while the blade is in the lowest position. As a result, the force applied by the blades varies continuously in a certain range of values, and subsequently, vibration, endurance and cavitation problems are encountered.

Cavitation: the propeller blades in aerofoil shape function as wing flaps. Water passing through circumference of the blade creates a low pressure in front while it increases pressure at the back. A big part of propeller effect occurs in the low pressure area. If the pressure drops below the evaporation pressure of water at any point, bubbles occur in the water. The propellers which are used in the sea due to cavitation are made with much larger blades than those used in the air.

One of the important problems of making propellers is that the ship force is transformed to the repelling force in the preliminary specified rotation number. This is dependent on propeller pitch on a large scale. The facts of that the pitch is dependent on the angle made with the flow direction of the blades and that the generated repelling force and pressure are resulted from the motion of the propeller make the pitch important as regards cavitation. Thus, any cavitation which may occur is decreased by arranging the pitch so as to be changed on the whole surface of the blade for each value of the radius.

As for the propellers; in a preferred patent application, U.S. Pat. No. 4,1318,671, American origin, dated 1982; in this patent, a special structure is referred to; this structure is related to use polymer surface on triquetrous blade edges in order to decrease energy losses arising on ship propellers and related to decrease surface losses causing to turbulence. In the current invention, a surface pass in three different angles on the propeller blade is used to increase energy efficiency.

In the U.S. Pat. No. 4,171,183, dated 16 Oct. 1979; a mechanism which may change the propeller blade angles purposing to increase energy efficiency is proposed differently. The blade angle varying depending on the speed (pitch control) can be used as an attachment in the propeller design proposed herein. The blade angle control is independent from the main concept of the design mentioned here. In the U.S. Pat. No. 4,932,908 and dated 12 Jun. 1990, the propeller blade countervails the fluid flowing in with an oblique shaft angle, purposing to minimize the viscous friction on the propeller blade, to minimize kinetic energy losses on the blade and to increase total energy efficiency. In the current invention, the triquetrous propeller blade profile and total energy conversion efficiency are increased without causing to a difference as to the shaft.

The U.S. Pat. No. 6,877,692B2, dated 12 Apr. 2005 refers to reverse phase oscillation of two propeller blades to each other purposing to increase energy conversion efficiency in the fluid, and to ensure the compressed fluid generates repelling force.

The U.S. Pat. No. 4,073,601, dated 14 Feb. 1978 contains generating propeller blade surfaces in high speeds. While the current invention has a similar mechanism decreasing cavitation effect, the main difference is that the reverse direction input (attack) angle and release (trailing) angles have specific values increasing energy conversion efficiency simultaneously, and that the blade profile is designed accordingly.

BRIEF SUMMARY OF THE INVENTION

The objective of the current invention is to achieve the high energy efficiency developed to use in aircrafts and sea vehicles, pumping systems, wind and hydraulic energy turbines, and to eliminate vibration.

Another objective of the current invention is to make sure that no bubbling occurs behind the vessel when she does not go ahead due to the propeller status. The system is based on that the aerodynamic attack intake to water can receive water and the existing blade seats onto the entire high pressure surface keeping balance as required.

An objective of intervention is to achieve high force by pushing with the entire surface of the blade as the whole blade contacts water.

An objective of invention is to be able to adapt to all kind of vessels easily. It is so designed to easily adapt to the system without need to replace the propeller if it is integrated with the ship.

The current invention is designed to maximize the energy transfer during transition between profiler fluid displacement and rotational motion, and the basic feature of the propeller developed to this purpose is that there are three separate areas based on the different axial direction changes of the fluid flowing through the blade.

Another objective of the invention is to eliminate noise and humming arising in the propellers which are used in the existing methods in 90% in the new propeller structure. As the noise is decreased in 90%, no bubbling occurs.

Another objective of the current invention is following; in the propellers used within the existing methods, the engine rpm decreases from 3200 to 2600. With the new propeller, rpm increases from 3200 to 3500. In consequence of revolution, she drives at a speed of 12 miles per hour. Thanks to this development, fuel can be saved and high power and performance is achieved.

Another objective of the invention is that the blades span and each blade end form a G-corridor shape.

After the fluid enters from aerodynamic attack intake and then is received, "Receipt Area", the fluid reaches maximum pressure in the middle area, "Transition Area". Finally in the "Pushing Area", the fluid takes pushing, repulsion and trailing actions to leave blade surface. The hydrodynamic efficiency increases when the fluid received from inlet is transformed to pushing motion and the pushing motion is transformed to the rotational motion.

Another objective of the invention is that the blade mechanism with three different surfaces and with two different, reverse direction angles decreases turbulence and cavitation, and in this way, maximum energy transfer efficiency is achieved between the rotational motion of the blade and displacement motion at vertical axis. In this propeller design, ventilation losses are minimum since the output fluid creates an uninterrupted parallel flow in compare to the rotational axis. According to the density and nominal rotational speed of the fluid for which they are used, the concave and convex surfaces and surface area and numbers of blades can be adjusted in 36 different ways.

In order to achieve aforementioned objectives, said invention covers propeller blades which are distributed around propeller hub and positioned so as to set an angle with the axis of propeller hub (x), a concave curvilinear contact surface which are formed on the front surface of said blades that push water and a convex outlet radius which follows this contact surface and is shorter than said contact surface.

BRIEF DESCRIPTION OF THE SEVERAL VIEWS OF THE DRAWINGS

FIG. 1; A perspective view of the propeller which is subject matter of the invention when it is positioned on the hub with a certain angle of blades.

FIG. 2; A two dimensional front view of the propeller which is subject matter of the invention.

FIG. 2.1; A two dimensional view of the propeller which is subject matter of the invention as sectioned in G-G area.

FIG. 2.2; A two dimensional view of the propeller which is subject matter of the invention as sectioned in H-H area.

FIG. 3; A two dimensional top view of propeller blade which is subject matter of the invention separately.

FIG. 3.1; a two dimensional view of propeller blade, as sectioned in C-C area.

FIG. 3.2; a two dimensional view of propeller blade, as sectioned in D-D area.

FIG. 3.3; a two dimensional view of propeller blade, as sectioned in E-E area.

FIG. 3.4; a two dimensional, view of propeller blade, as sectioned in F-F area.

FIG. 4; a two-dimensional view of propeller blade, as sectioned when it is on propeller hub.

FIG. 4.1 A representative view of surfaces where the fluid contacts the propeller blade.

FIG. 5; A two-dimensional top view illustrating all blades of the blade which is subject matter of the invention.

FIG. 5.1; A sectional view of the blade which is subject matter of the invention.

PART NUMBERS

10—Propeller
11—Propeller hob
12—Positioning surface
13—Blade
13.1 Back radiused surface
13.2 Plane surface
13.3 Contact surface
13.4 Output radiused surface
13.5 Attack intake
13.6 G-corridor
13.7 Back surface
a—Front, surface
b—Back surface
c—Radius starting point
c1—Radius ending point.
c2—Plane surface ending point
d—Friction surface
f—Blade rotational direction

DETAILED DESCRIPTION OF THE INVENTION

Said invention is related to a propeller used in aircraft/sea vessels, pumping systems, wind and hydraulic turbines, and covers propeller blades (13) which are distributed around propeller (10) hub (11) positioning surface and fixed so as to set an angle with the axis (x) of propeller hub (11), a concave curvilinear contact surface (13.3) which are formed on the front surface (a) of said blades (13) that push water and a convex outlet radius (13.4) which follows this contact surface (13.3) and is shorter than said contact surface (13.3), a back radiused surface (13.1) formed from radius starting point (c) till the ending point (c1) on the back surface (h) of said blades (13) and a plane surface (13.2) formed in an area from the ending point of said radius (c1) till the ending point of plane surface (c2).

Said propeller (10) directs the fluid which it receives from the contact surface (13.3) in rotational direction (f) towards hull-blade mid-part with a certain angle change first, and then it releases in the reverse direction to the first change under maximum pressure but with a second radius change having a smaller value when passing through the output radius (13.4), and consequently, the front-back pressure difference occurring according to the blade rotation axis releases the fluid in linear lines (without turbulence) incremental direction relatively according to its current speed, and the efficiency to transform the rotational energy to the linear motion energy increases in compare to the conventional propeller profiles while cavitation and friction effects on the propeller blade surface decrease.

The blade (13) contact surface (13.3) is concave comparing to the axis (b) of the back surface, and thus, it contributes to the pushing pressure arising from rotation. The edge of contact surface (13.3) where the fluid is received is lower oblique in compare to the convex back and the composition of the bottom surface forms a thin surface and thus losses arising from scraping the fluid to the top and bottom surfaces can be minimized. If we denominate the area comprising contact surface (13.3) and output radiused surface (13.4) as friction surface (d);

$$d=13.3+13.4$$

$$13.3>13.4$$

That is, the contact surface (13.3) of the friction surface (d) takes a space of 90% more in compare to the output radius (13.4).

The output radiused surface (13.4) is smaller than contact surface (13.3) and a turbulence effect occurs at the point the contact surface (13.3) ends and the output radiused surface (13.4) starts.

After the back radiused surface (13.1) fluid enters from aerodynamic attack intake and then is received, the fluid reaches maximum pressure in the middle area, of contact surface (13.3). The contact surface (13.3) having a broad area and big radius takes pushing, repulsion and trailing actions and leaves blade surface through output radius (13.4).

The blade mechanism with three different surfaces and with two different, reverse direction angles decreases turbulence and cavitation, and in this way, maximum energy transfer efficiency is achieved between the rotational motion (10) of the blade and displacement motion at vertical axis. In this propeller design, ventilation losses are minimum since the output fluid creates an uninterrupted parallel flow in compare to the rotational axis.

The aforementioned plane surface (13.2) extends along the back of the blade (13) and it has ⅓ width of the projectional length of the blade width (13). The back radiused surface (13.1) intersects with the plane surface (13.2) and has R radius which constitutes ⅔ of the projectional width of the back and so completes the remaining part of the back.

On the empty end of said back radius (13.1), there is an internal contact surface (13.3) with a radius of 1.5 R intersecting with the propeller rotational plane so as to make an angel of 3 to 9 grade, and there is an output radiused surface (13.4) with 0.5 R intersecting with the plane positioned lower the half of blade end thickness of said internal contact surface (13.3) and said plane surface, and bending in the opposite direction of the internal contact surface (13.3). The distance of the intersection point of said radiused surfaces (13.1, 13.3) which has R and 1.5 R radius to the plane where the back plane surface (13.2) is positioned is ¼ and ⅕ of projectional width of the back. The F diameter of blade back surface (13.7) is in the range of diameter between R400 and a R650. If the diameter of blade back surface (13.7) is 600, the fluid must be opened after passing through the blade and it must cause a wide based pushing. Thus, a wide based pushing must be made if the diameter is R600.

If the blades (13) are fixed so as to make angles of 36°, 40°, 44° and 48° to the positioning surface (12) of propeller hub (11), and if this base line (13) angel is 36°, A-distance: 55, B-distance: A/5, C-distance; A/3, D-distance; A/3. When K-diameter is 112, L-diameter becomes 90.

If the blades are positioned in angles of 36°, 40°, 44° and 48°, the A, B, C, E, K and L rates are as listed in the following table.

|   | 36° | 40° | 44° | 48° |
|---|---|---|---|---|
| A → | 55 | 66 | 77 | 88 |
| B → | A/5 | A/5 | A/4 | A/4 |
| C → | A/3 | A/3 | A/3 | A/3.5 |
| E → | A/3 | A/3 | A/3 | A/3 |
| K ↗ | 112 | 158 | 161 | 165 |
| L ↗ | 90 | 120 | 120 | 120 |

If K diameter is A/K, it has a R diameter ranging between 0.49~0.53.
If L diameter is A/L; it has a R diameter ranging between 0.55~0.73.
K = (0.49~0.53) XA
L = (0.55~0.73) XA
B = A.1/5 = A.0.2

The invention claimed is:

1. A propeller for use in aircraft, sea vessels, pumping system, wind turbines and hydraulic energy turbines, the propeller comprising:
a blade having a planar surface that extends along a back of said blade and having a width of ⅓ of a width of said blade, said blade having a back radiused surface that intersects said planar surface, said back radiused surface having a radius that is two-thirds of a width of said back of said blade so as to complete a remaining portion of said back of said blade, said blade having an internal contact surface on an empty end of said back radiused surface, said internal contact surface having a radius that is 1.5 times the radius of said back radiused surface, said internal contact surface intersecting a rotational plane of the propeller at an angle of between 3 and 9 degrees, said blade having an output radiused surface which has a radius of one-half the radius of said back radiused surface, said output radiused surface intersecting a plane positioned at a lower half of an end thickness of said internal contact surface and said plane surface, said output radiused surface bending in a direction opposite to said internal contact surface, a distance of an intersection point of said back radiused surface and said internal contact surface to a plane to which of said plane surface is positioned being between ¼ and ⅕ of the width of said back which is a sum of said back radiused surface and said plane surface, a diameter of a back surface of said blade is between 400 and 650 times a radius of said back radius surface.

2. The propeller of claim 1, further comprising:
a hub affixed to said blade, said blade comprising a plurality of blades, the blades extending at an angle of between 36° and 48°.

* * * * *